United States Patent Office

3,808,138
Patented Apr. 30, 1974

3,808,138
COMPOSITION FOR REMOVING OXYGEN FROM WATER AND METHOD THEREFOR
Hideo Yamaguchi and Hidetoshi Kume, Naruto, and Isao Manabe, Tokushima-ken, Japan, assignors to Otsuka Kagaku Yokuhin Kabushiki Kaisha, Osaka-shi, Japan
No Drawing. Filed June 30, 1972, Ser. No. 267,933
Int. Cl. C02b 1/18
U.S. Cl. 252—188                                  6 Claims

ABSTRACT OF THE DISCLOSURE

A composition for removing oxygen from water comprising an aqueous medium having dissolved therein hydrazine and cobalt maleic acid hydrazide, and a method for removing oxygen from water by adding the above composition to water containing oxygen dissolved therein.

---

This invention relates to a composition for removing oxygen dissolved in water and a method for removing oxygen dissolved in water.

Disoxidants such as sodium sulfite, sodium bisulfite, etc., have hitherto been used for removing oxygen dissolved in water to protect the apparatus from corrosion. Sodium sulfite or sodium bisulfite, when added to water in a circulating system as a disoxidant, however, causes accumulation of salts such as sodium sulfate, etc., in the water. Moreover, sodium sulfite or sodium bisulfite used in water of high temperatures, e.g., boiler water will generate corrosive gases such as sulfur dioxide, hydrogen sulfide, etc. In order to overcome the above drawbacks it has recently been proposed to use an aqueous hydrazine solution as a disoxidant.

Although hydrazine eliminates the accumulation of salts and generation of corrosive gases, it does not display a satisfactory disoxidation effect unless added to water of high temperature such as boiler water, etc., because of its lower rate of reaction with dissolved oxygen at a temperature lower than 50° C. In order to obviate this defect, it has been proposed to use cobalt chloride or quinone as a catalyst in combination with hydrazine. However, since such catalyst has a fatal defect of decomposing hydrazine itself within a short period of time when mixed with hydrazine, it is impossible to prepare a ready-mixed composition. It was therefore necessary to reserve hydrazine and catalyst separately and to add catalyst to a hydrazine solution when it is put to use. Even if the catalyst is used, moreover, disoxidation effect of hydrazine is still insufficient at a relatively low temperature, particularly at a temperature lower than 30° C., this preventing effective removal of oxygen from water of room temperature or lower. Moreover, the known disoxidants as above cannot achieve a sufficient anticorrosive effect, unless they are used together with anticorrosive agents.

It is, therefore, a main object of the present invention to eliminate the above drawbacks of the known disoxidants.

Another object of the present invention is to provide a composition and a method for removing oxygen from water which are effective in a wide temperature range of from room temperature to high temperature as in a boiler.

A further object of the present invention is to provide a composition and a method for removing oxygen from water which achieve a distinguished anticorrosive effect throughout a wide range of temperature without using anticorrosive agents jointly therewith.

A further object of the present invention is to provide a ready-mixed composition which can be used by a simple procedure.

A further object of the present invention is to provide a composition and a method for removing oxygen from water without causing accumulation of undesirable salts in water and generation of corrosive gases even at high temperatures and pressures as in the boiler.

These and other objects of the present invention will be apparent from the description to follow.

The composition of the present invention comprises an aqueous medium having dissolved therein hydrazine and cobalt maleic acid hydrazide.

According to the research of the present inventors, it has been found that when hydrazine is added to water in combination with cobalt maleic acid hydrazide, hydrazine is quickly reacted with the oxygen dissolved in the water throughout a wide temperature range of from room temperature to high temperature as in the boiler, to produce $N_2$ and $H_2O$, thereby reducing the oxygen content effectively within a short period of time. Further it has been discovered that by adding hydrazine and cobalt maleic acid hydrazide to water a remarkable anticorrosive effect is obtained throughout a wide range of temperatures without using any anticorrosive agent. The reason why such an excellent anticorrosive effect is ensured has not been made clear, but it is presumably attributable to the synergetic effect of hydrazine and cobalt maleic acid hydrazide. It has further been found that cobalt maleic acid hydrazide never decomposes hydrazine, so that a stable ready-mixed composition can be provided.

According to the present invention, hydrazine is preferably used in the form of an aqueous solution containing hydrazine dissolved in deoxidized water. In the aqueous solution hydrazine forms hydrazine hydrate. An aqueous hydrazine solution of not more than 55 wt. percent is commercially available and such solution can be used favorably in the present invention. The concentration of hydrazine in the composition is not more than 55 wt. percent, preferably in the range of 1 to 50 wt. percent. Cobalt maleic acid hydrazide to be used is at least 0.01 wt. percent, preferably 0.01 to 2 wt. percent, based on the weight of the hydrazine. Less amount of cobalt maleic acid hydrazide results in insufficient reaction of hydrazine with oxygen in the water and a poor anticorrosive effect, whereas amount larger than 2% will not improve the effectiveness with the cost increased.

The present method is carried out by adding the present composition to water from which oxygen is to be removed. The composition is added to the water in at least one mole of hydrazine per mole of the oxygen dissolved in the water. More preferably the amount of hydrazine is in the range of 2 to 3 moles per mole of the oxygen. In such preferable amount not only effective removal of oxygen dissolved in the water can be ensured but also an excellent anticorrosive effect is achieved by reducing rust ($Fe_2O_3$) on the inner surface of a steel apparatus to magnetite ($Fe_3O_4$) by synergetic effect of hydrazine and cobalt maleic acid hydrazide. Excess amount of hydrazine will not produce a greater disoxidation effect, in spite of a cost increase.

The pH value of the water to be treated is preferably in the active range of hydrazine, namely at a pH of 8 to 12, more preferably at a pH of 10 to 11. The pH value of the water can be adjusted by adding excess amount of hydrazine or by adding thereto a suitable alkaline substance such as a buffer solution of sodium hydroxide and phosphoric acid, a buffer solution of sodium hydroxide and disodium phosphate, a sodium hydroxide solution, a potassium hydroxide solution, etc.

The water to be treated can be at any temperature from room temperature to the high temperature as in the boiler.

For a better understanding of the present invention examples are given below, in which all percentages are by weight and oxygen contents were determined by Beckman oxygen analyzer.

EXAMPLE 1

A composition was prepared by adding to an aqueous hydrazine solution containing 40% of hydrazine hydrate 0.56% of cobalt maleic acid hydrazide based on the hydrazine content. The composition thus obtained was added to deionized water in the amount of 0.05% based on the water, said deionized water containing 7.5 p.p.m. of oxygen dissolved therein and adjusted to a pH value of 10.5 with a buffer solution of sodium hydroxide and disodium phosphate. The water thus treated was maintained at various temperatures to determine decrease in oxygen with the lapse of time. The results are shown in Table 1.

In Table 1 are also shown the results in the cases that a 40% aqueous hydrazine hydrate solution containing 0.56% of cobalt chloride (Comparison I) and a 40% aqueous hydrazine hydrate solution (Comparison II) were used respectively in place of the composition of the present invention.

TABLE 1

| | Oxygen content in p.p.m. | | | | | |
|---|---|---|---|---|---|---|
| | 25° C. | | | | 60° C. | |
| | After 5 min. | After 10 min. | After 15 min. | After 30 min. | After 5 min. | After 30 min. |
| Example 1 | 2.5 | 0.8 | 0.2 | Trace | 2.0 | Trace |
| Comparison: | | | | | | |
| I | 6.0 | 4.9 | 3.8 | 2.0 | 5.0 | 1.8 |
| II | 7.3 | 7.2 | 7.1 | 7.0 | 7.0 | 6.5 |

From Table 1 above, it is apparent that the composition according to the present invention displays an excellent disoxidation effects on the water even below 30° C. to quickly reduce the oxygen content.

EXAMPLE 2

The compositions of Example 1 and Comparison I were charged in 1-liter open polyethylene vessels respectively and left to stand in a constant temperature chamber kept at 40° C., to analyze decrease in hydrazine hydrate with the lapse of time for the comparison of the degree of decomposition of hydrazine. The results are given in Table 2.

TABLE 2

| | Concentration of hydrazine hydrate (percent) | | |
|---|---|---|---|
| | After 1 day | After 3 days | After 2 months |
| Eqample 1 | 40 | 40 | 39 |
| Comparison I | 39 | 37 | 5 |

It is apparent that the composition of the present invention containing hydrazine and cobalt maleic acid hydrazide is very stable, while hydrazine solution containing cobalt chloride is decomposed quickly.

EXAMPLE 3

Three samples were prepared by adding 0.05% of the composition of Example 1, the composition of Comparison I and the hydrazine solution of Comparison II respectively to the deionized water having initial oxygen concentration of 7.5 p.p.m. After being adjusted to a pH value of 10.5 with a buffer solution of sodium hydroxide and phosphoric acid, each of the three samples was charged in two 500 cc. wide-mouthed bottles, in each of which a steel test piece (SS 41 of JIS G-3101, 31 mm. x 30 mm. x 1 mm.) was suspended for immersion and subjected to a corrosion test for 3 days at 40° C. and 60° C., respectively. Reduction in weight of each test piece due to corrosion was determined upon termination of the test with the results listed in Table 3. The same corrosive test as above was conducted by using the deionized water having initial oxygen concentration of 7.5 p.p.m. and adjusted to a pH value of 10.5 with the results shown in Table 3.

TABLE 3

| Disoxidant used | Reduction in weight of test piece (mg.) | |
|---|---|---|
| | 40° C. | 60° C. |
| Eqample 1 | 0.7 | 0.9 |
| Comparison I | 1.3 | 1.8 |
| Comparison II | 1.4 | 1.9 |
| Control (without disoxidant) | 2.4 | 3.5 |

Table 3 shows that the composition of the present invention has not only an excellent disoxidation effect, but a unique anticorrosive effect due to the synergetic effect of hydrazine and cobalt maleic acid hydrazide.

EXAMPLE 4

Three kinds of compositions were prepared by adding to a 4% hydrazine hydrate solution cobalt maleic acid hydrazide in an amount of 0.03%, 1.0% and 3.0% respectively, based on the weight of the hydrazine. Three compositions thus prepared were added in an amount of 0.5% based on the water to the deionized water containing 7.5 p.p.m. of oxygen and adjusted to a pH value of 11 with a buffer solution of sodium hydroxide and phosphoric acid. Three kinds of the water thus obtained were left to stand at room temperature and their decreases in oxygen were measured with the lapse of time, with the results listed in Table 4.

TABLE 4

| Cobalt maleic acid hydrazide contained in the composition (wt. percent) | Oxygen content in p.p.m. | |
|---|---|---|
| | After 10 min. | After 30 min. |
| 0.03 | 0.90 | Trace. |
| 1.0 | 0.80 | Do. |
| 3.0 | 0.75 | Do. |

From Table 4, it is apparent that with the increase of cobalt maleic acid hydrazide disoxidation effect is heightened, but larger amount than 2% does not improve the effect.

What we claim is:

1. A composition for removing oxygen from water consisting essentially of an aqueous medium having dissolved therein hydrazine in a concentration of up to 55 percent by weight and at least 0.01 percent cobalt maleic acid hydrazide, based on the weight of hydrazine.

2. The composition for removing oxygen from water according to claim 1, in which said concentration of the hydrazine is 1 to 50 wt. percent.

3. The composition for removing oxygen from water according to claim 1, in which said cobalt maleic acid hydrazide is contained in the range of 0.01 to 2 wt. percent, based on the weight of the hydrazine.

4. A method for removing oxygen from water, comprising treating water having oxygen dissolved therein at pH of 8–12 by adding to the water a composition consisting essentially of an aqueous medium having dissolved therein hydrazine in a concentration of up to 55 percent by weight and at least 0.01 percent cobalt maleic acid hydrazide, based on the weight of hydrazine.

5. The method for removing oxygen from water according to claim 4, in which said composition is added to the water in at least 1 mole of hydrazine per mole of the oxygen dissolved in the water.

6. The method for removing oxygen from water according to claim 5, in which said composition is added to the water in the range of 2 to 4 moles of hydrazine per mole of the oxygen dissolved in the water.

References Cited
UNITED STATES PATENTS

| | | | |
|---|---|---|---|
| 3,634,232 | 1/1972 | Dunlop | 252—387 |
| 3,728,281 | 4/1973 | Marks et al. | 21—2.7 R |

FOREIGN PATENTS

| | | | |
|---|---|---|---|
| 833,744 | 4/1960 | Great Britain | 252—178 |
| 1,372,979 | 8/1964 | France | 252—178 |

LELAND A. SEBASTIAN, Primary Examiner

I. GLUCK, Assistant Examiner

U.S. Cl. X.R.

21—2.7 R; 210—63; 252—81, 178, 387; 423—407